(No Model.)
L. EBERHART.
CHECK ROWER ATTACHMENT FOR SEED PLANTERS.
No. 272,538. Patented Feb. 20, 1883.
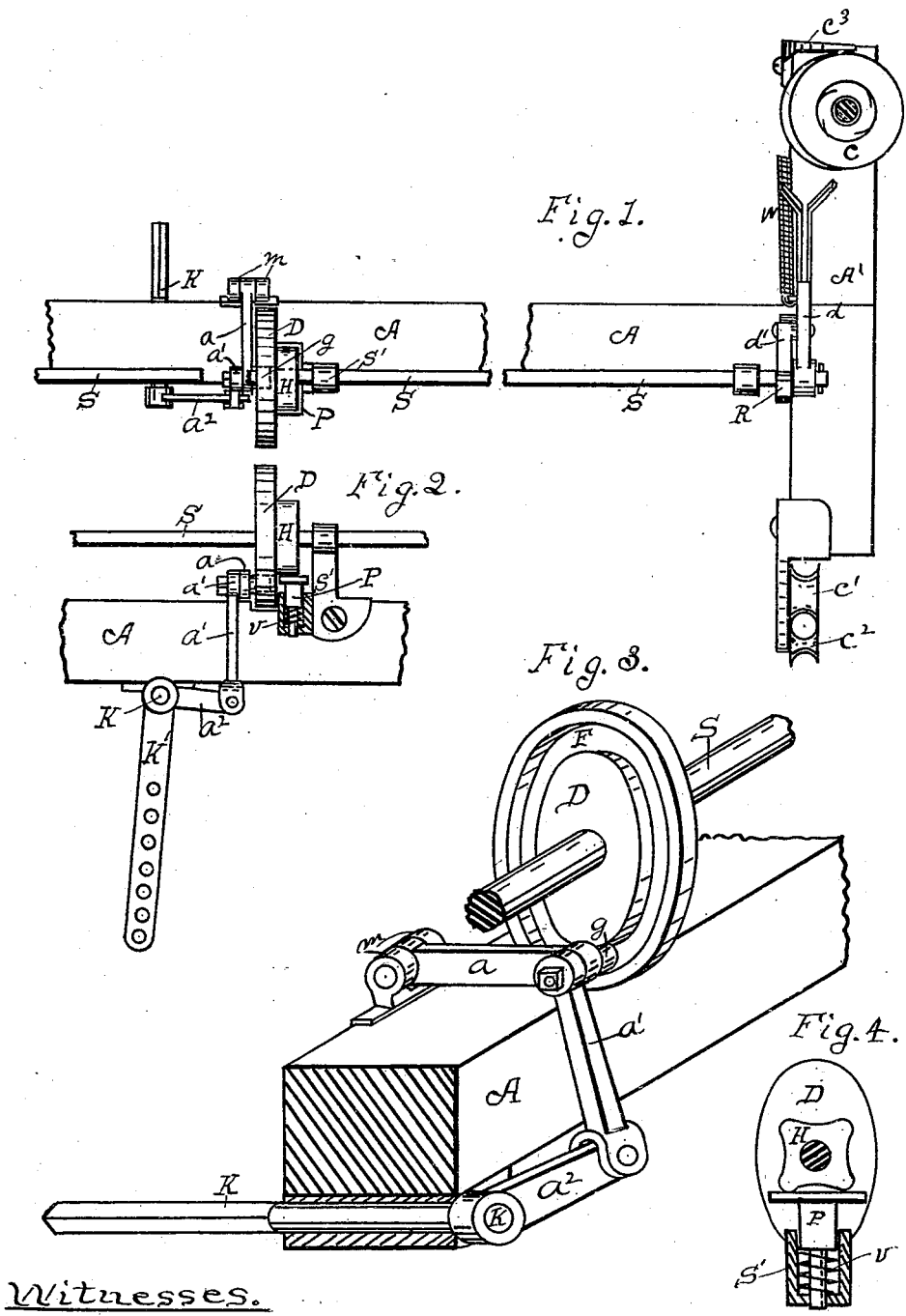
Witnesses.
Thos H. Hutchins
Wm J Hutchins
Inventor.
Lloyd Eberhart.

UNITED STATES PATENT OFFICE.

LLOYD EBERHART, OF JOLIET, ILLINOIS.

CHECK-ROWER ATTACHMENT FOR SEED-PLANTERS.

SPECIFICATION forming part of Letters Patent No. 272,538, dated February 20, 1883.

Application filed November 21, 1882. (No model.)

*To all whom it may concern:*

Be it known that I, LLOYD EBERHART, of the city of Joliet, in Will county and State of Illinois, have invented certain new and useful Improvements in Check-Rower Attachments for Seed-Planters, the construction and operation of which I will proceed to explain, reference being had to the annexed drawings and the letters and figures thereon, making a part of this specification, in which—

Figure 1 is a plan view on the top; Fig. 2, a side elevation of the center portion; Fig. 3, a perspective view of the center portion, and Fig. 4 a rear view of the cam, showing the hub and the manner of its engagement, with the stop device below it.

This invention relates to that class of machines known as "check-row attachments for seed-planters," and is adapted to be attached to any ordinary seed-planter having a reciprocating seed-slide, and is operated by means of a knotted wire stretched stationary across the field, causing the machine to actuate the dropping portion of the planter to drop the seed in hills and rows each way across the field without the necessity of first marking the ground.

Referring to the drawings, A represents the main beam of the device which supports the working parts, and is provided at either end with the ordinary cross-heads, A', to which the guide-sheaves $c$, $c'$, and $c^2$ and guide $c^3$ are attached by suitable standards to support and conduct the knotted wire across the machine.

As the knotted wire crosses the end of the machine as the machine travels the knots on the wire engage with the forked lever $d$, causing it to move backward until the knot on the wire slips or passes out of the forked lever and permits a return of the forked lever to its original position by means of the spring $w$.

The pawl $d'$, attached to the side of the forked lever, engages with a suitable ratchet, R, on the shaft S, to give it an intermittent rotary motion, and give a similar motion to the cam D, rigidly attached to said shaft.

The cam D is provided with a face-channel, F, elliptical in shape, or nearly so, in which the outer end of the lever $a$ operates and moves up and down. The said lever hinges at its rear end in the top of the standard $m$, and by means of the pitman $a'$ is attached to the lever $a^2$ on the end of the rocking shaft $k$, journaled to the under side of the beam A, to which rocking shaft the drop-lever attaches that actuates the seed-slide of the planter in the ordinary manner.

The hub H of the cam D is constructed as shown in Fig. 4, having its four sides concave in shape and the corners rounded to operate easily. This hub H rotates on the top of the spring-plunger P, below it, to arrest the rotation of the shaft S and cause it to remain stationary after the forked lever has turned it one-fourth way around, and thereby prevent a rebound of the seed-slide by means of the resiliency of spring on the stem of the plunger P, causing constant pressure of said plunger against said hub H, as shown in Fig. 4.

My invention does not consist in any one portion of this device, as I concede each separate part is old; but what I have invented is the combination and arrangement of these parts in a new manner, and is designed as an improvement on the check-rower for which a patent was granted to me November 28, 1882, No. 268,085. I am also aware that the use of a stop to arrest the rotation of the shaft S intermittently has been used in various forms heretofore, and that it is not new to so arrest the rotation of said shaft; but I am not aware of the use of the mechanism I have described in combination with such a check-row attachment for such purpose.

Having thus described my invention, what I claim as new, and desire to secure by Letters Patent, is as follows, to wit:

1. The combination of the shaft S, hub H, plunger P, spring V, cam D, having the face or cam channel F, lever $a$, pitman $a'$, lever $a^2$, and rock-shaft $k$, all arranged to operate in the manner and for the purpose set forth.

2. In a check-rower attachment for seed-planters, the combination of the cam-wheel D, having the face-channel F, shaft S, lever $a$, pitman $a'$, lever $a^2$, and rocking shaft $k$, all adapted to operate in the manner and for the purpose set forth.

LLOYD EBERHART.

Witnesses:
THOS. H. HUTCHINS,
WM. J. HUTCHINS.